US009571194B2

(12) United States Patent
Burch

(10) Patent No.: US 9,571,194 B2
(45) Date of Patent: Feb. 14, 2017

(54) NEAR-FIELD CONNECTIVITY FOR HOSTED PAYLOADS

(71) Applicant: The Boeing Company, Chicago, IL (US)

(72) Inventor: Ronald W. Burch, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 387 days.

(21) Appl. No.: 14/097,667

(22) Filed: Dec. 5, 2013

(65) Prior Publication Data

US 2015/0162955 A1 Jun. 11, 2015

(51) Int. Cl.
| H04B 10/118 | (2013.01) |
| B64G 1/64 | (2006.01) |
| B64G 1/10 | (2006.01) |
| H04B 5/00 | (2006.01) |
| B64G 1/42 | (2006.01) |

(52) U.S. Cl.
CPC ............ *H04B 10/118* (2013.01); *B64G 1/428* (2013.01); *B64G 1/646* (2013.01); *H04B 5/0031* (2013.01); *B64G 2001/1092* (2013.01)

(58) Field of Classification Search
CPC ............... H04B 10/11–10/118; H04B 5/0031; B64G 2001/1092
See application file for complete search history.

(56) References Cited

U.S. PATENT DOCUMENTS

| 5,271,582 A * | 12/1993 | Perkins et al. ............. 244/173.1 |
| 5,726,786 A | 3/1998 | Heflinger | |
| 6,181,450 B1 * | 1/2001 | Dishman ............ H04B 7/18521 370/281 |
| 6,643,470 B1 * | 11/2003 | Iida ..................... H04J 14/0298 359/278 |
| 6,792,212 B1 * | 9/2004 | Lloyd et al. ................. 398/124 |
| 2002/0089714 A1 * | 7/2002 | Shimoyama ........... H04B 10/11 398/43 |
| 2002/0104927 A1 | 8/2002 | Pedreiro | |
| 2006/0015299 A1 | 1/2006 | McDermott et al. | |
| 2007/0115735 A1 * | 5/2007 | Kishigami ....... G01R 31/31922 365/201 |
| 2009/0008503 A1 * | 1/2009 | Lloyd ..................... H04Q 9/00 244/158.1 |
| 2009/0052369 A1 * | 2/2009 | Atkinson et al. ............ 370/316 |

(Continued)

FOREIGN PATENT DOCUMENTS

| EP | 1032142 A2 | 8/2000 |
| EP | 2339296 A2 | 6/2011 |

OTHER PUBLICATIONS https://en.wikipedia.org/wiki/Transmitter.*

(Continued)

*Primary Examiner* — David Payne
*Assistant Examiner* — Casey Kretzer
(74) *Attorney, Agent, or Firm* — Patterson + Sheridan LLP

(57) ABSTRACT

A system and method for wirelessly communicating between a host bus of a spacecraft and a secondary payload. In one configuration, the host bus and secondary payload each include a wireless interface for establishing a radio or optical communications link thereby allowing for the elimination of a complex wiring harness connected between the host bus and the secondary payload.

25 Claims, 6 Drawing Sheets

(56) References Cited

U.S. PATENT DOCUMENTS

2010/0157801 A1    6/2010  Liu et al.
2010/0279604 A1*  11/2010  Wood .......................... 455/12.1

OTHER PUBLICATIONS https://en.wikipedia.org/wiki/Radio_(receiver).*
European Patent Office, European Search Report & Written Opinion, Application No. 14196501.2-1754, dated May 7, 2015.

* cited by examiner

NEAR-FIELD CONNECTIVITY FOR HOSTED PAYLOADS

TECHNICAL FIELD

The field of the embodiments presented herein is directed toward hosted payloads on spacecraft, and more particularly, to wirelessly interfacing between the resources of a host bus of the spacecraft and a hosted payload.

BACKGROUND

Commercial and government entities increasingly consider alternative means of getting payloads to orbit in order to save time and money. Hosted payloads are used by those seeking to have capabilities in orbit without having to pay the cost of building and launching an entire spacecraft. A hosted secondary payload is a module with mission-specific circuitry attached to the spacecraft, which operates independent of the spacecraft's primary payload, but shares the spacecraft's resources such as a power supply. This concept is sometimes referred to as "piggy backing" and can reduce both the expense and time required to get capabilities into space.

The spacecraft typically includes a host bus housing the primary payload, such as a communications satellite, and a propulsion system. The secondary payload is then mechanically and electrically connected to the host bus with a complex wiring harness. The resources of the host bus are therefore shared between the primary and secondary payloads. However, the host bus and the secondary payload are typically manufactured by different entities. Therefore, the wired harness results in numerous customized connections that not only add weight to the spacecraft but also add time and expense to the manufacturing and launching of the spacecraft.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a spacecraft is provided having a host bus for hosting a secondary payload. A first wireless interface is coupled to the bus and a second wireless interface is coupled to the secondary payload. The first and second wireless interfaces are configured to exchange information bi-directionally between the host bus and the secondary payload. The spacecraft no longer requires a wiring harness connected between the host bus and the secondary payload for exchanging information such as telemetry and control information.

According to another embodiment disclosed herein, a near-field communication system is provided. The near-field communication system includes a first spacecraft having a host bus with a primary payload. The near-field communication system also includes a secondary payload. Wireless interfaces are coupled to the host bus and secondary payload. The wireless interfaces are configured to provide at least one of free-space point-to-point radio and free-space point-to-point optical communications of telemetry and command information between the host bus and secondary payload. In one or more configurations, a hardwire power connection is the only hardwire connection between the host bus and the secondary payload. Also, in one or more configurations, the near-field communication system with the wireless interfaces provides a low power and low data rate connection between the host bus and the secondary payload.

According to yet another embodiment disclosed herein, a routine for exchanging information is provided. The routine includes providing a host bus of a first spacecraft. The routine also includes hosting a primary payload with the host bus and hosting a secondary payload with the host bus. The routine then includes establishing a wireless communications link between the host bus and the secondary payload and exchanging information via the wireless communications link. In one or more configurations, establishing the wireless communications link includes a near-field free-space radio communications link or a near-field free-space optical communications link between the host bus and secondary payload.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

Figure 1:
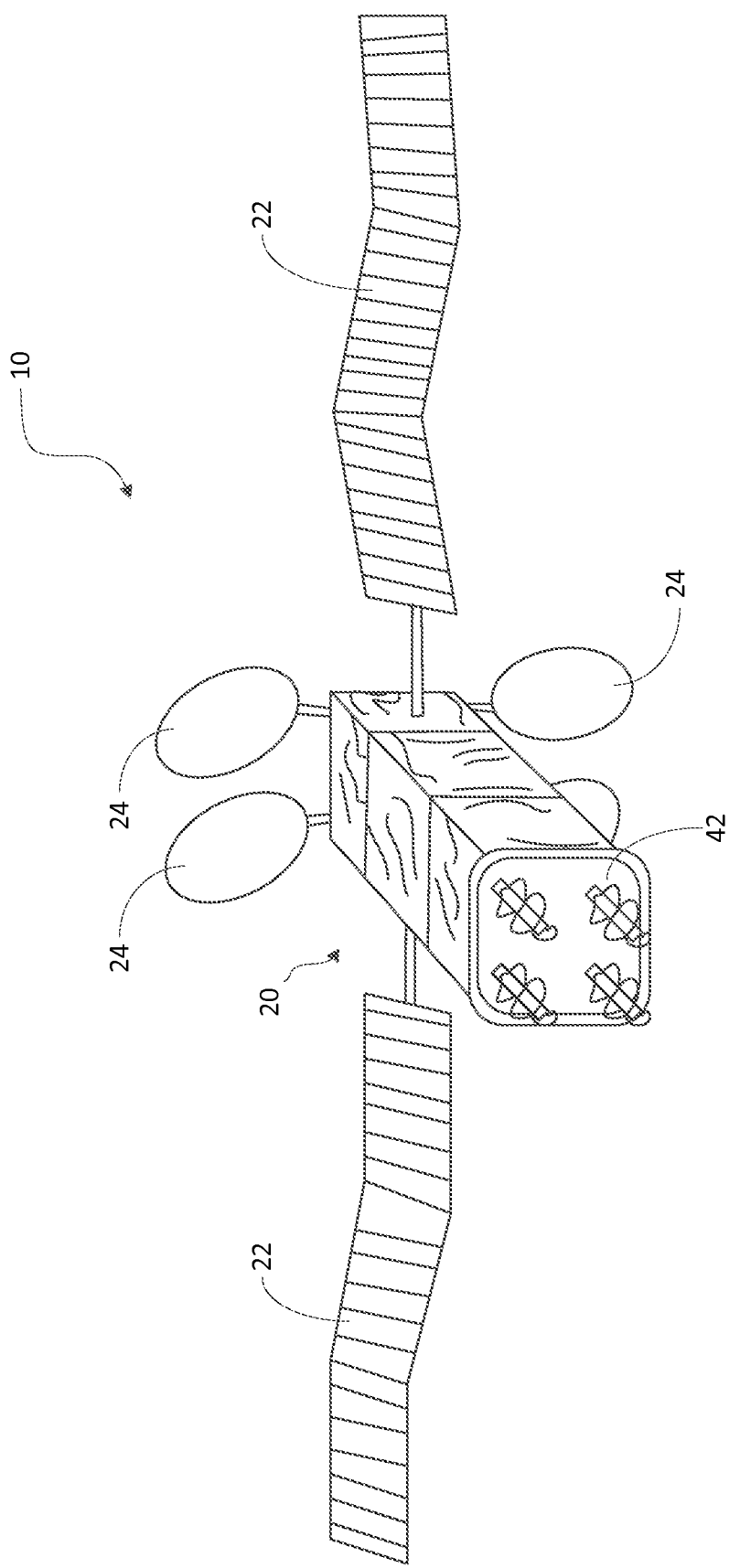
FIG. 1 illustrates a perspective view of one configuration of a spacecraft hosting primary and secondary payloads according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to near-field connectivity for hosted payloads. The present invention is susceptible of embodiment in many different forms. There is no intent to limit the principles of the present invention to the particular disclosed embodiments. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

For the sake of simplicity in explaining aspects of the present disclosure, FIG. 1 depicts an exemplary spacecraft 10 as the primary example as described in greater detail below. However, as will be seen, many aspects of the present disclosure are not limited to the spacecraft 10. The spacecraft 10 may also be generally referred to simply as an orbital unit or as a satellite that is carried into orbit by a multistage rocket or other space vehicle.

Also, for the sake of simplicity, the term information may refer to many forms of data including unorganized data or other data that is processed, organized, structured, analyzed, or presented, so as to make it useful, that may typically be referred to as information, and may also refer to data converted into one or more signals in order to be transferred electrically from one point to another. The signals may be either digital or analog. Telemetry, tracking and command subsystems perform several routine functions aboard the spacecraft 10. Telemetry refers to the overall operation of generating an electrical signal proportional to the quantity being measured and encoding and transmitting these signals. Data is transmitted as telemetry signals include attribute information obtained from sensors, environmental information, and spacecraft information such as temperatures, power supply voltages and stored fuel pressure. Command systems receivers instructions referred to as commands from the ground and decodes the instructions and sends commands to other systems of the spacecraft 10.

As well understood by those in the art, the spacecraft 10 includes a host bus 20, a solar panel arrays 22, and antenna reflectors 24. While on top of a multistage rocket propelling the spacecraft 10 into orbit above the earth, the space craft 10 is enclosed within a payload faring (not shown) that protects the spacecraft 10 while firing one or more of the stages of the multistage rocket. When the spacecraft 10 is in orbit, the solar panel arrays 22 are deployed and pointed towards the sun as the spacecraft 10 moves to satisfy thermal and power requirements of the spacecraft 10.

Figure 2:
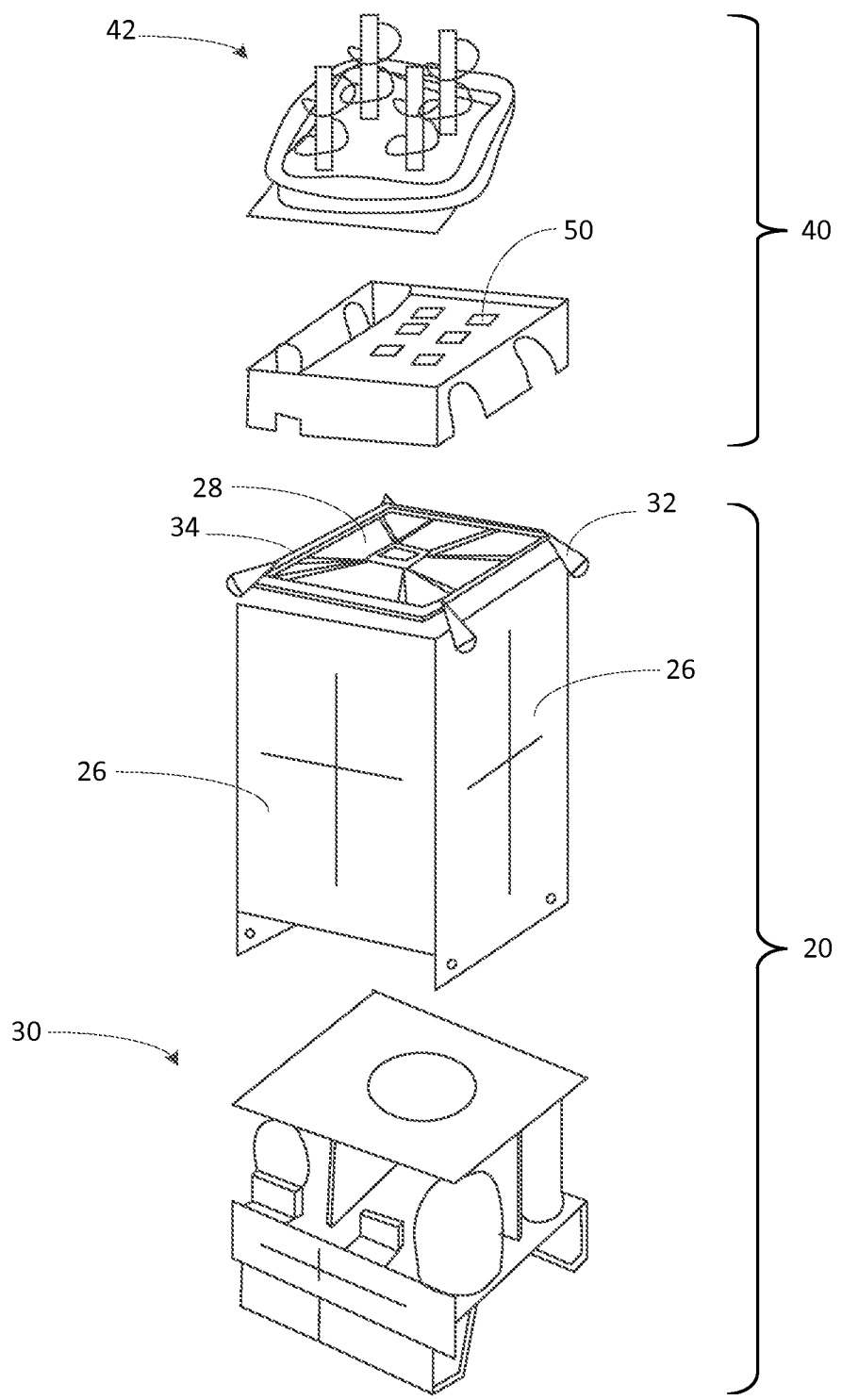
FIG. 2 illustrates an exploded perspective view of one configuration of the spacecraft having primary and secondary payloads according to at least one embodiment disclosed herein.

The host bus 20 includes four sides, a top and a bottom, commonly referred to as shelves, for forming an enclosure. However, the spacecraft 10 is not limited to any particular number of shelves. As best shown in FIG. 2, the spacecraft 10 includes four shelves 26 (two shown) and a top shelf commonly referred to as the nadir shelf 28 because it is the downward-facing shelf of the spacecraft 10 when the spacecraft 10 is properly oriented while orbiting the earth. The host bus 20 also includes a propulsion system 30, that includes fuel tanks, batteries, and a thruster (not shown) on the bottom, mounted opposite the nadir shelf 28 for maneuvering the spacecraft 10 while in orbit. Typically, the host bus 20 also includes feed horns 32 pointed at the antenna reflectors 24 when the antenna reflectors 24 are unfolded. The feed horns 32 are attached to a frame 34 mounted on the nadir shelf 28 of the host bus 20.

As well understood by those skilled in the art, the host bus 20 houses a primary payload (not shown), such as a commercial communications satellite, within the enclosure formed by the shelves 26 and the nadir shelf 28. One or more secondary payloads 40 are attached to the host bus 20 preferably at the nadir shelf 28 so that an antenna assembly 42 of the secondary payload 40 is pointed downward toward the earth while the spacecraft 10 is orbiting the earth and that the secondary payload 40 can have its own downlink for outputting data. Although one secondary payload 40 is depicted, aspects of this disclosure contemplate any number of secondary payloads 40 interfacing with the host bus 20. For example, multiple secondary payloads may be piggybacked on one another to share the resources of the host bus 20.

In one or more configurations, the secondary payload 40 shares the primary payload's power supply via a wired power connection from the host bus 20 of the spacecraft 10, but the secondary payload 40 otherwise includes its own communications circuitry and any other mission specific hardware and software to operate independently of the primary payload and other resources of the host bus 20 of the spacecraft 10. In order to interface with one another, the host bus 20 and the secondary payload 40 each include a wireless interface 50, in place of the typical wire harness, to eliminates the cost, complexity and weight of the wiring harness. The shielding required as a result of interference from parallel wiring of the wiring harness itself may also be eliminated. Data and information such as telemetry and command signals can be transmitted between the host bus 20 and the secondary payload 40 when in proximity or link range of one another.

For example, ground control may send a commend signal via an uplink to the spacecraft 10 and through the wireless interface 50 of the host bus 20. Then the command signal across the wireless communications link or crosslink from the host bus 20 to the secondary payload 40 may be used to configure the secondary payload 40 or change the state of the secondary payload 40. The secondary payload 40 may transmit telemetry signals back across the wireless communications link to the host bus 20 describing the status, configuration, and health of the secondary payload 40. Also, command signals from the secondary payload 40 to the host bus 20 may be used to configure or change the state of the host bus 20 or the primary payload. The host bus 20 may then transmit telemetry signals to the secondary payload 40 describing the status, configuration, and health of the host bus 20 or the primary payload. For example, if secondary payload 40 were an imaging satellite having imaging equipment and did not have its own downlink to ground control, the secondary payload 40 could output data or information such as pictures or video to the wireless interface 50 of the host bus 20 and then the downlink of the primary payload could be utilized to transmit the images or video to ground control.

Figure 3:
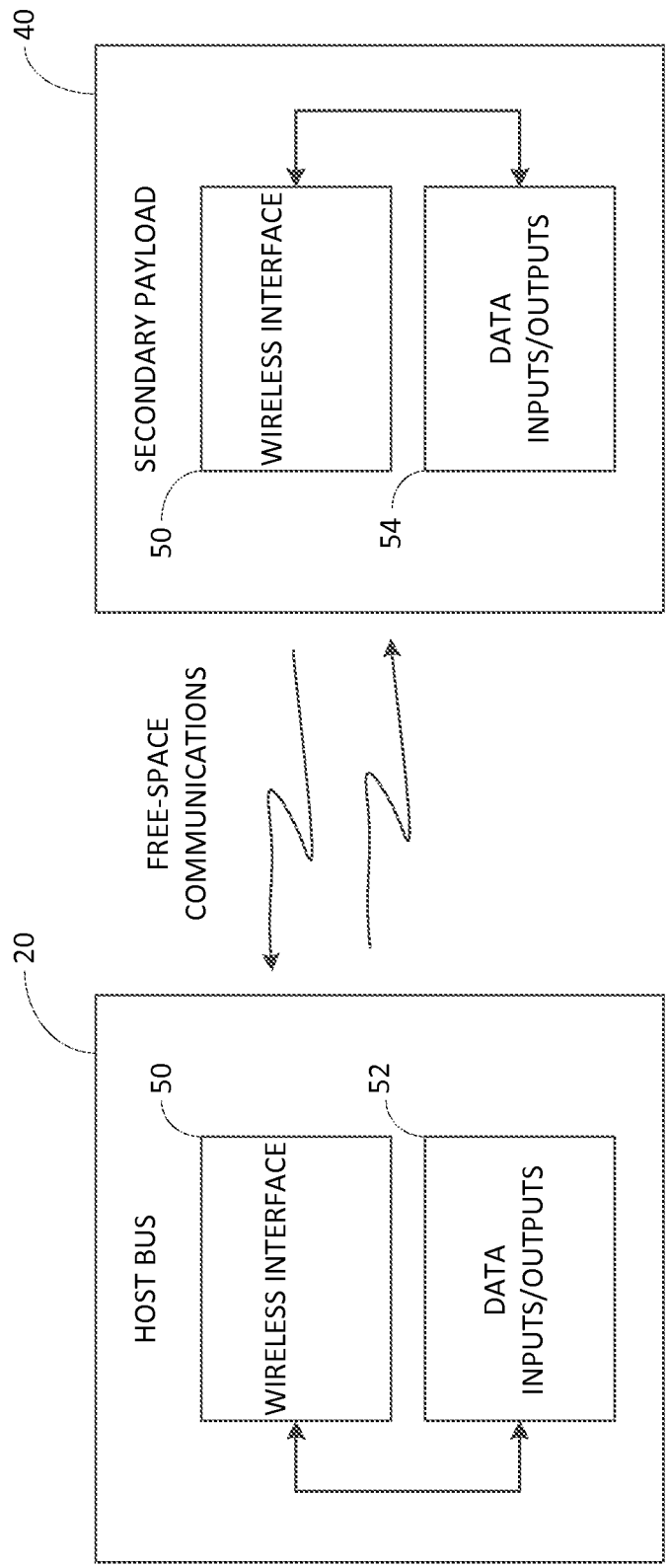
FIG. 3 illustrates block diagrams of one configuration of the wireless interface of the spacecraft's host bus and the wireless interface of the secondary payload configured for free-space communications according to at least one embodiment disclosed herein.

FIG. 3 illustrates the host bus 20 having a wireless interface 50 and the secondary payload 40 also having a wireless interface 50. The host bus 20 includes data inputs/outputs 52 for exchanging information via its wireless interface 50 and the secondary payload includes data inputs/outputs 54 for exchanging information via its wireless interface 50. FIG. 3 also depicts bi-directional free-space communications between the host bus 20 and the secondary payload 40 via the wireless interface 50 when in line-of-sight of one another. Therefore, for example, the communications can be free-space optical communications or free-space radio frequency (RF) communications.

Information such as telemetry and command data can more easily be transmitted wirelessly between the host bus 20 and the secondary payload 40 than with a wiring harness because of the number of translations required to use the wiring harness as a result of, for example, the primary payload and the secondary payload 40 being manufactured by different entities with different specifications. For example, if the secondary payload 40 were hard wired to the host bus 20 and the connections were not standardized then electrical translations would be required to change voltages and currents transmitted between the host bus 20 and the secondary payload 40. These electrical translations would need to occur each time a host bus 20 is connected to a different secondary payload 40 from a different manufacturer. These electrical translations become an expensive and time consuming endeavor for the manufacturer of the host bus 20 and the different secondary payload 40 manufactures.

The wireless transmissions between the wireless interfaces 50 of the host bus 20 and the secondary payload 40 may be any type of wireless or contactless communication capable of the transfer or exchange of information between two or more points that are not connected by a physical connection such as an electrical conductor. For example, the wireless interfaces 50 may be configured for wireless radio communications or optical communications with radio transmitters and receivers/transceivers or laser transmitters and receivers/transceivers. In such case, the translations between electrical and radio or optical signals are relatively simple compared to the electrical translations required when hard wiring the host bus 20 to various unstandardized secondary payloads 40 from different manufacturers. Wireless radio communications are more flexible in that to implement it line-of-sight is not required. On the other hand, wireless optical communications are not susceptible to interference from the rest of the spacecraft 10.

Various types of bi-directional wireless radio technology may be used such as or similar to standards-based wireless technology such as WiFi or preferably some other point-to-point wireless technology not requiring a wireless access point as a central hub such as, but not limited to, WiFi Direct which could create a direct communication link, with the wireless interfaces 50 acting as endpoints, between the host bus 20 and the secondary payload 40. Preferably, a range of radio frequencies other than those used by the standards-based wireless technologies may be used. Point-to-point communications between the host bus 20 and the secondary payload 40 may also include laser technologies.

In one or more configurations, the wireless communication are preferably low power and short-range wireless technologies integrated into the wireless interfaces 50 such as, but not limited to, near field (NFC), ANT, ANT+, or Bluetooth radio wireless communications in that information may be transferred or exchanged between the host bus 20 and the secondary payload 40 when in close proximity to one another. For example, short-range wireless communications could be established when the wireless interfaces 50 of host bus 20 and the secondary payload 40 are local to one another in link range, for example, within a few yards apart to only a few inches or less apart depending on the configuration of the short-range wireless communications. Bluetooth is often referred to as a 10 meter technology. In any case, the range of the wireless technology is proportional to the radio frequency sensitivity of the receiver and the power of the transmitter. In regard to the spacecraft 10 with the secondary payload 40, the wireless communications only need to establish a link with the wireless interfaces 50 between the host bus 20 and the secondary payload 40 through the nadir shelf 28. Typically, this distance is only a few inches, only a fraction of an inch, or nearly zero, and therefore the close proximity permits the performance of a low power wireless link to be tailored for lower frequencies and lower data rates. It should be appreciated that any laser communications transferring data over links between satellites have been demonstrated only at high data rates and in context of far-field communications at great distances such as thousands of miles apart or other than locally. One or more aspects of the disclosure prefer low data rates in the kilobits per second range whereas the higher data rates between distant satellites are in the gigabits per second range.

Figure 4:
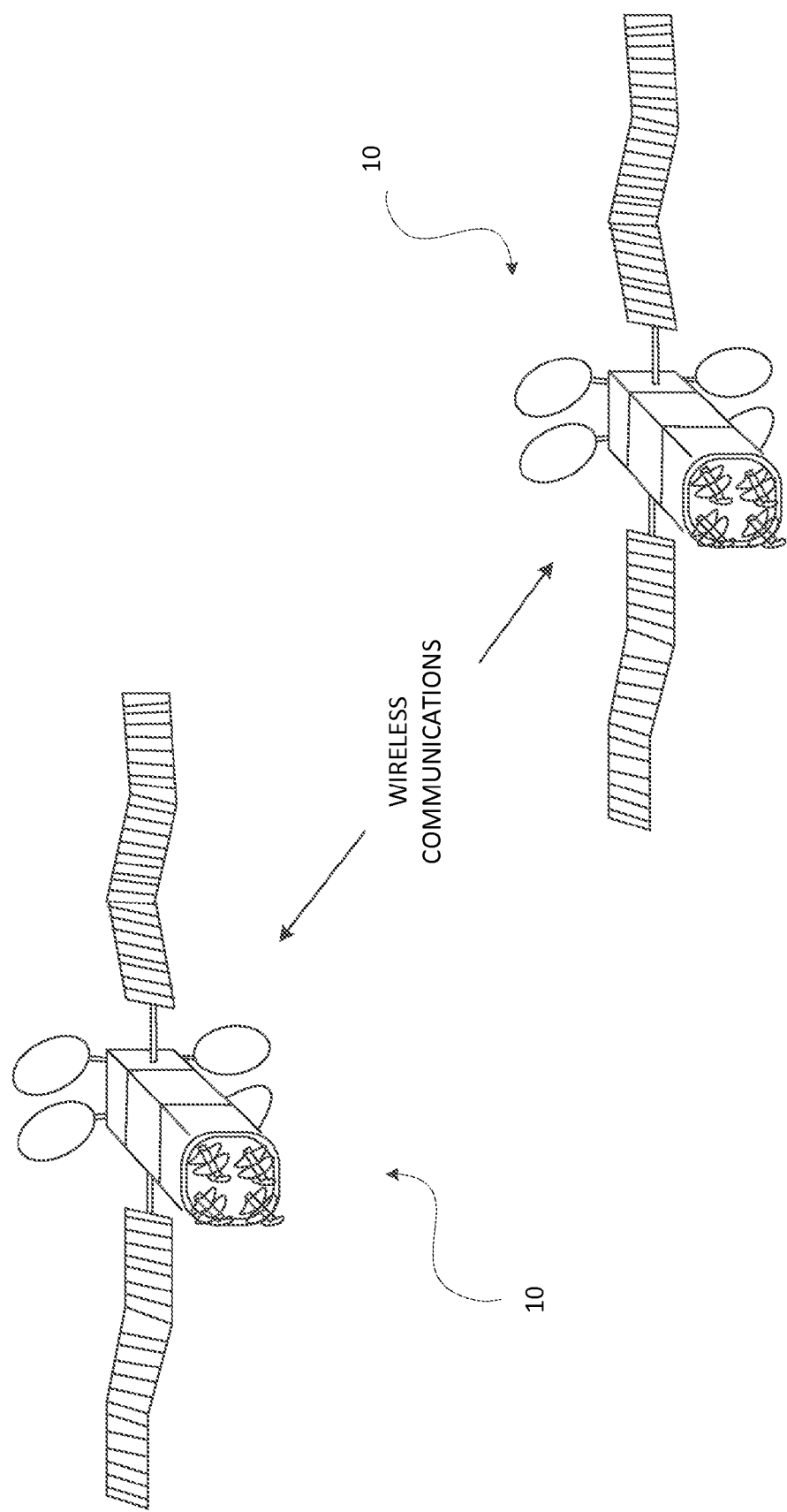
FIG. 4 illustrates a perspective view of two adjacent spacecraft with a wireless communications link therebetween according to at least one embodiment disclosed herein.

In one or more configuration, the wireless interfaces 50 include a free-space point-to-point optical communication system for transmitting and receiving information by means of line-of-sight light beams in space using for example lasers or light emitting diodes (LEDs). For example, the light beams such as a low data rate infrared laser could propagate between the host bus 20 and the secondary payload through the nadir shelf 28. In one or more other configurations, a first spacecraft 10 could arrive in orbit in space to rendezvous with a second spacecraft 10 as shown in FIG. 4. The first spacecraft 10 may approach the second spacecraft 10 within link range at a close distance, not requiring docking or berthing, for example within a few yards or within visual contact, and match orbital velocities, allowing the first spacecraft 10 to establish a communications link with the adjacent second spacecraft 10. The wireless interface 50 of the host bus 20 on the first spacecraft 10 could interface with the wireless interface 50 of the host bus 20 on the other another spacecraft 10 in link range of the first spacecraft 10.

In one or more other configurations, command signals could be sent to the secondary payload 40 to receivers of the secondary payload 40 indicating what frequencies to tune to. Each receiver could then send telemetry back to the host bus 20 about which frequencies have been tuned to. On/off commands could also be sent to the receivers of the secondary payload 40 depending on what the mission of the secondary payload 40 is. Other types of commands could include steering commands to tell the antenna assembly 42 how to move in order to point a particular direction. Commands for switching resolution modes of imaging equipment or for initiating or ending recordings could also be sent to the secondary payload 40.

Figure 5:
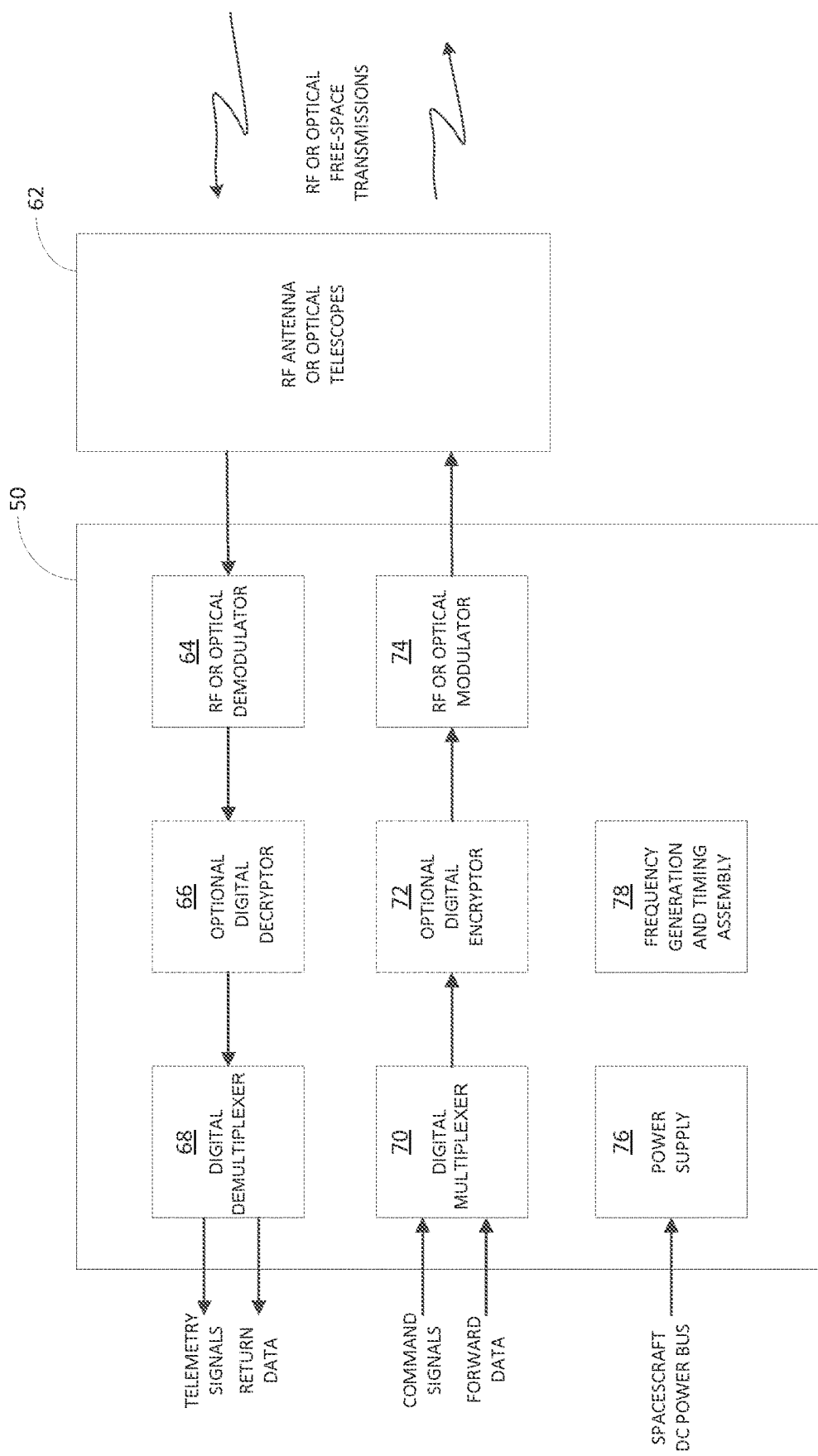
FIG. 5 illustrates one configuration of a block diagram showing an illustrative wireless interface capable of implementing aspects of the embodiments presented herein.

FIG. 5 illustrates one configuration of each wireless interface 50 for implementing one or more embodiments of the disclosure. Via the wireless interfaces 50, data is multiplexed and modulated onto one or more RF or optical carrier signals and the data is recovered after reception by demultiplexing and demodulating the received signals. For example, digital data on a modulated carrier signal from the secondary payload 40 received wirelessly at the antenna 62 is input to the wireless interface 50 of the host bus 20. A demodulator 64 recovers the digital data from the RF carrier signal and performs any necessary signal conversions. If all or part of the signals from the demodulator are encrypted the wireless interface 50 can include a decryptor 66. Multiplexed signals may then be demultiplexed by the demultiplexer 68 and the return data and telemetry signals are output from the demultiplexer 68 and sent to resources within the host bus 20. On the other hand, command signals and forward data from the resources of the host bus 20 are input to the multiplexer 70 and all or part of the multiplexed signals may be encrypted by the optional encryptor 72. The multiplexed signals from the multiplexer 70 are received at a modulator 74 to make the necessary conversion to be transmitted to and received by the wireless interface 50 of the secondary payload 40. Although FIG. 5 is explained above in the context of data and signals processed by the wireless interface 50 of the host bus 20, data and signals processed by the wireless interface 50 of the secondary payload 40 may occur in a similar manner. Power can be provided to a power supply 76 of the wireless interface 50 from a DC power bus of the spacecraft 10. Each wireless interface 50 can also include a frequency generation and timing assembly 78 as a master clock to synchronize signals exchanged by the wireless interface 50. Various types of modulation, encryption and multiplexing may be used depending on the mission of the secondary payload 40.

Figure 6:
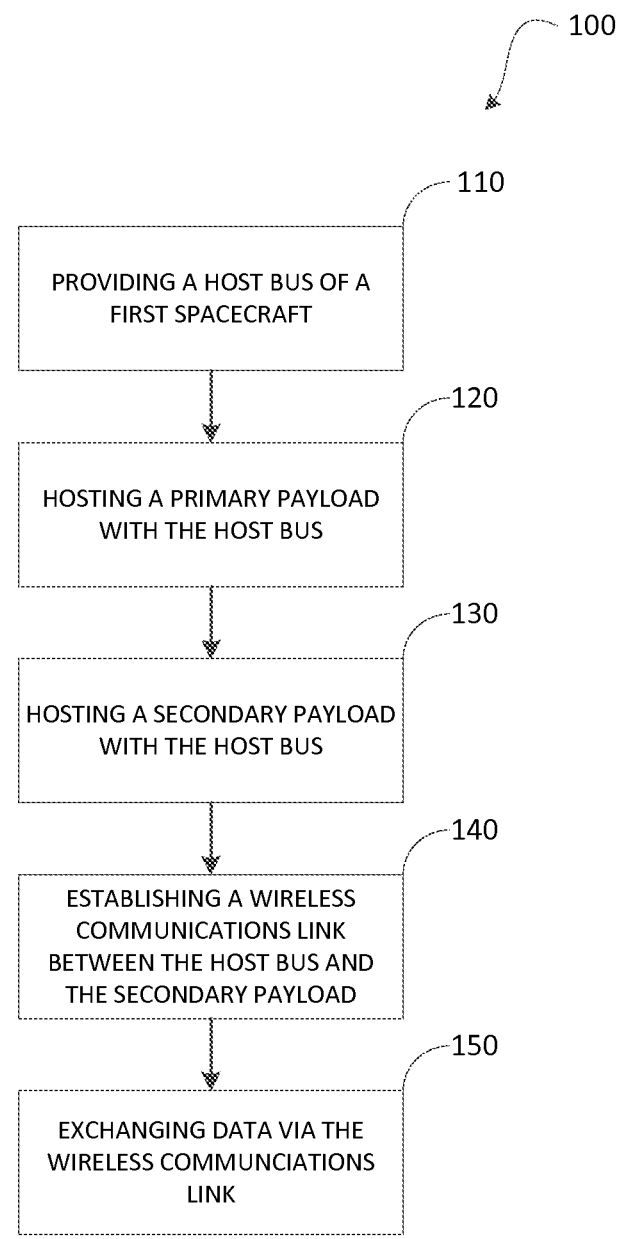
FIG. 6 illustrates one configuration of a routine for exchanging information between a host bus and a secondary payload of one or more spacecraft according to at least one embodiment disclosed herein.

FIG. 6 illustrates a routine 100 for exchanging information with one or more of the spacecraft 10. Unless otherwise indicated, more or fewer operations may be performed than shown in the figures and described herein. Additionally, unless otherwise indicated, these operations may also be performed in a different order than those described herein. The routine 100 may start at operation 110, where a host bus 20 of a first spacecraft 10 is provided. Operation 120 includes hosting a primary payload with the host bus 20. Operation 130 includes hosting a secondary payload 40 with the host bus 20. At operation 140, the routine 100 includes establishing a wireless communications link between the host bus 20 and the secondary payload 40. For example, the operation 140 of establishing the wireless communications link may include establishing either a near-field free-space radio communications link or a near-field free-space optical communications link between the host bus 20 and the secondary payload 40.

The routine 100 may also include the operation 150 of exchanging information via the wireless communications link. The routine 100 may also include the operations of commanding the secondary payload 40 from the host bus 20 via the wireless communications link. The routine 100 may also include the operation of rendezvousing with a second spacecraft 10 which includes the secondary payload 40 to establish a wireless communications link. The routine 100 may also include the operation of commanding the secondary payload 40 of the second spacecraft 10 from the first spacecraft 10.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A spacecraft comprising:
   a secondary payload;
   a host bus for hosting the secondary payload;
   a first wireless interface coupled to the host bus; and
   a second wireless interface coupled to the secondary payload, wherein the first and second wireless interfaces each include a demodulator and a demultiplexer communicatively coupled for receiving data and a modulator and a multiplexer communicatively coupled for transmitting data and are configured to exchange information bi-directionally between the host bus and the secondary payload, and wherein the second wireless interface coupled to the secondary payload is configured to multiplex telemetry signals to command signals using the multiplexer, wherein the command signals, once received by the host bus, one of configure and change a state of the host bus, and
   wherein each of the first and second wireless interfaces further comprises a decryptor and an encryptor, and wherein the first and second wireless interfaces are configured to first demodulate received information using the demodulator, then decrypt the demodulated information using the decryptor, and then demultiplex the decrypted information using the demultiplexer.

2. The spacecraft of claim 1, without a wiring harness connected between the host bus and the secondary payload for exchanging telemetry and control information, wherein the host bus and secondary payload each include an antenna, wherein information received from one of the antennas is sent to one of the first and second wireless interfaces which is configured to demodulate the information using the demodulator and then demultiplex the information using the demultiplexer.

3. The spacecraft of claim 1, wherein the first and second wireless interfaces provide free-space radio communications between the host bus and the secondary payload.

4. The spacecraft of claim 1, wherein the first and second wireless interfaces provide free-space optical communications between the host bus and the secondary payload.

5. The spacecraft of claim 1, wherein the first and second interfaces provide near-field communication between the host bus and the secondary payload.

6. The spacecraft of claim 1, wherein the first and second interfaces are spaced apart a distance less than two inches to provide a low power and low data rate connection between the host bus and the secondary payload.

7. The spacecraft of claim 1, wherein the first and second interfaces provide a point-to-point connection between the host bus and the secondary payload.

8. The spacecraft of claim 1, wherein the information comprises telemetry and command information.

9. The spacecraft of claim 1, wherein the first wireless interface is further configured to exchange information with a payload of another spacecraft when in proximity of the spacecraft.

10. The spacecraft of claim 9, wherein the payload of the other spacecraft is a primary payload.

11. The spacecraft of claim 9, wherein the payload of the other spacecraft is a secondary payload.

12. The spacecraft of claim 1, wherein only a wired power connection exists between the host bus and the secondary payload.

13. The spacecraft of claim 1, wherein the command signals instruct the host bus to transmit video data which is captured by the secondary payload and transmitted to the host bus via the second wireless interface to ground control.

14. A near-field communication system, comprising:
   a first spacecraft comprising a host bus with a primary payload;
   a secondary payload; and
   first and second wireless interfaces coupled to the host bus and secondary payload, respectively, and configured to provide at least one of free-space point-to-point radio and free-space point-to-point optical communications of telemetry and command information between the host bus and the secondary payload, wherein each wireless interface includes a demodulator and a demultiplexer communicatively coupled for receiving data and a modulator and a multiplexer communicatively coupled for transmitting data, and wherein the second wireless interface coupled to the secondary payload is configured to multiplex telemetry signals to command signals using the multiplexer, wherein the command signals, once received by the host bus, one of configure and change a state of the host bus, and
   wherein each of the first and second wireless interfaces further comprises a decryptor and an encryptor, and wherein the first and second wireless interfaces are configured to first demodulate received information using the demodulator, then decrypt the demodulated information using the decryptor, and then demultiplex the decrypted information using the demultiplexer.

15. The near-field communication system of claim 14, wherein the wireless interfaces are spaced apart a distance less than two inches to provide a low power and low data rate connection between the host bus and the secondary payload.

16. The near-field communication system of claim 14, wherein the secondary payload is mechanically coupled to the host bus.

17. The near-field communication system of claim 14, wherein the secondary payload is coupled to a second spacecraft in proximity to the host bus of the first spacecraft.

18. The near-field communication system of claim 14, further comprising a hardwire power connection between the host bus and the secondary payload.

19. The near-field communication system of claim 14, wherein the command signals instruct the host bus to transmit video data which is captured by the secondary payload and transmitted to the host bus via the second wireless interface to ground control.

20. A method of exchanging information, comprising:
providing a host bus of a first spacecraft;
hosting a primary payload with the host bus;
hosting a secondary payload with the host bus;
establishing a wireless communications link between the host bus and the secondary payload using first wireless interface on the host bus and a second wireless interface on the secondary payload, wherein each wireless interface includes a demodulator and a demultiplexer communicatively coupled for receiving data and a modulator and a multiplexer communicatively coupled for transmitting data, wherein each of the first and second wireless interfaces further comprises a decryptor and an encryptor;
demodulating received information using the demodulators in the first and second wireless interfaces;
decrypting the demodulated information using the decryptors in the first and second wireless interfaces;
demultplexing the decrypted information using the demultiplexers in the first and second wireless interfaces; and
multiplexing telemetry signals to command signals using the multiplexer in the second wireless interface of the secondary payload wherein the command signals, once received by the host bus, one of configure and change a state of the host bus.

21. The method of claim 20, further comprising commanding the secondary payload from the host bus via the wireless communication link, wherein the host bus and secondary payload each include an antenna, wherein information received from one of the antennas is sent to one of the first and second wireless interfaces which is configured to demodulate the information using the demodulator and then demultiplex the information using the demultiplexer.

22. The method of claim 20, wherein establishing the wireless communications link comprises establishing a near-field free-space radio communications link between the host bus and secondary payload.

23. The method of claim 20, wherein establishing the wireless communications link comprises establishing a near-field free-space optical communications link between the host bus and secondary payload.

24. The method of claim 20, further comprising rendezvousing with a second spacecraft having the secondary payload to establish the wireless communications link.

25. The method of claim 24, further comprising commanding the secondary payload of the second spacecraft from the first spacecraft.

* * * * *

UNITED STATES PATENT AND TRADEMARK OFFICE
CERTIFICATE OF CORRECTION

| | | |
|---|---|---|
| PATENT NO. | : 9,571,194 B2 | Page 1 of 1 |
| APPLICATION NO. | : 14/097667 | |
| DATED | : February 14, 2017 | |
| INVENTOR(S) | : Ronald W. Burch | |

It is certified that error appears in the above-identified patent and that said Letters Patent is hereby corrected as shown below:

In the Claims

In Column 10, Line 5, in Claim 20, delete "demultplexing" and insert -- demultiplexing --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*